UNITED STATES PATENT OFFICE.

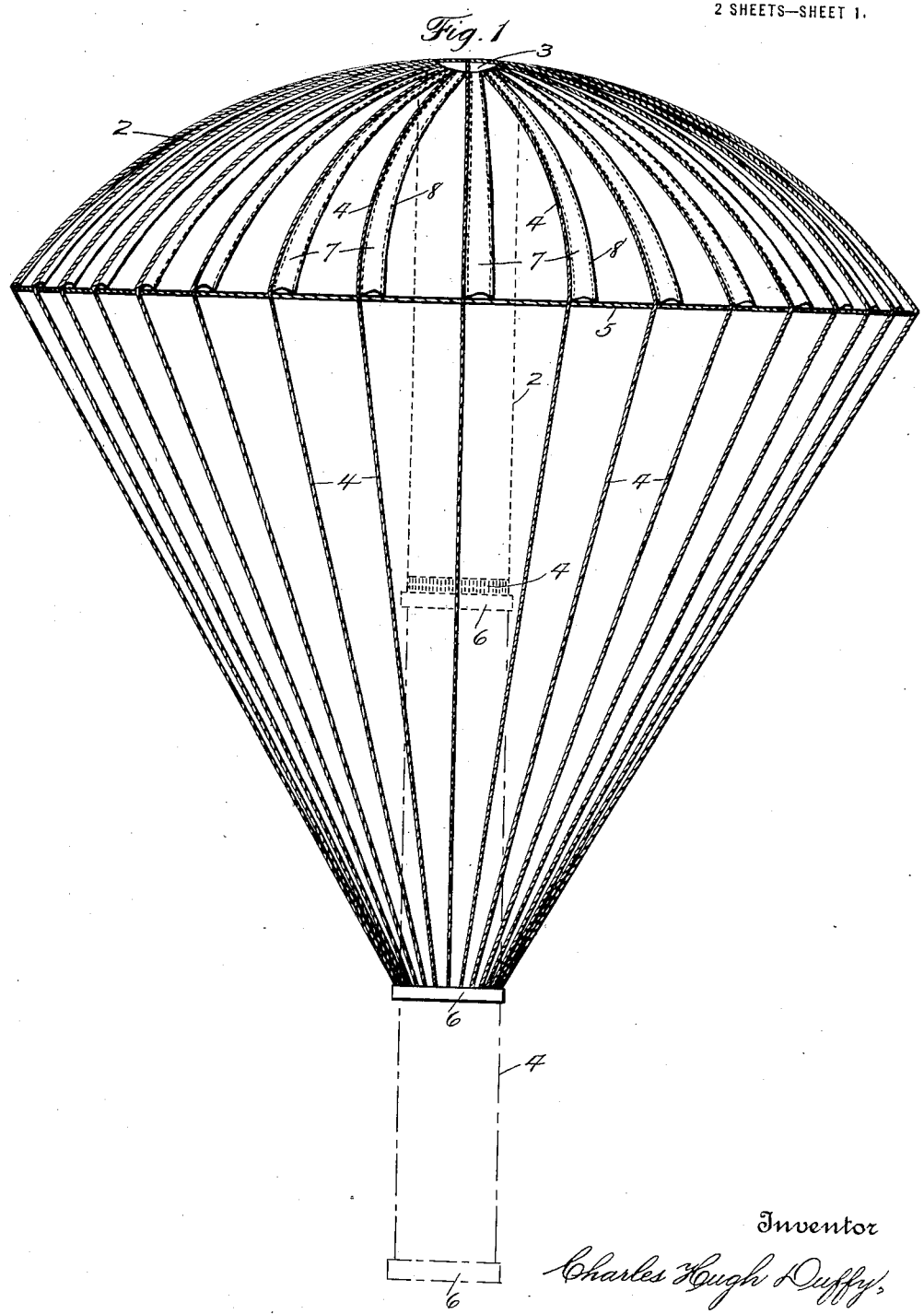

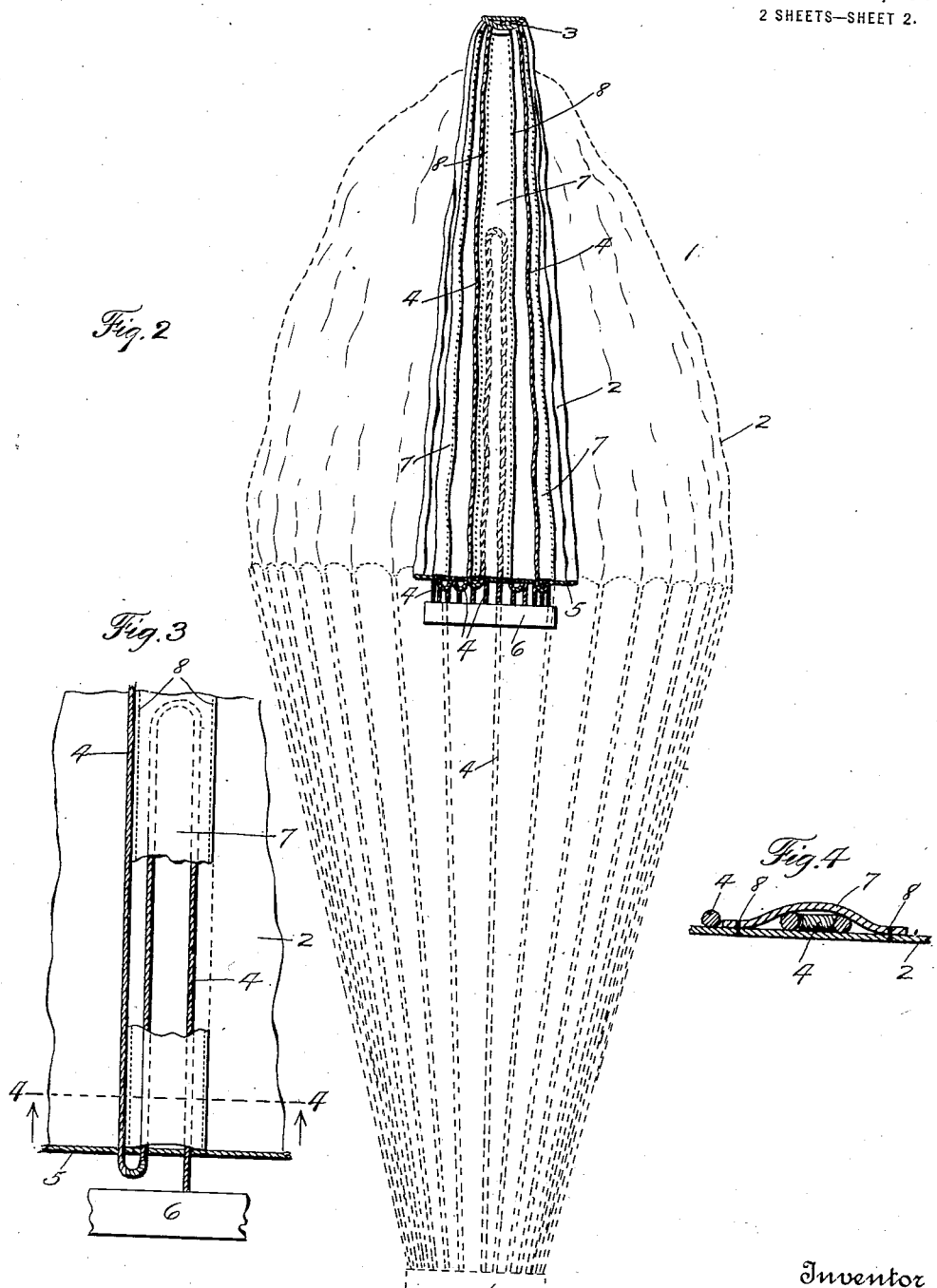

CHARLES HUGH DUFFY, OF CHEVY CHASE, MARYLAND.

PARACHUTE.

1,328,425.  Specification of Letters Patent.  Patented Jan. 20, 1920.

Application filed October 10, 1918. Serial No. 257,647.

*To all whom it may concern:*

Be it known that I, CHARLES HUGH DUFFY, a citizen of the United States, residing at Chevy Chase, county of Montgomery, State of Maryland, have invented certain new and useful Improvements in Parachutes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to aeronautical parachutes, and has for its object to provide a device of this class so constructed and arranged as to insure its prompt opening in operation, and thus increase the safety and efficiency of this class of devices.

A further object of the invention is to provide a parachute in which positive provision is made for the protection of the rigging-ropes against twisting or tangling, to the end that the parachute may be rolled, packed, stored or otherwise maintained available for instant use without danger of impairing the safe and efficient operation of the device.

A further object of the invention is to provide a parachute which can be handled and used with extreme haste and with greater assurance of safety than is possible with devices of this character now employed.

With these and other objects in view, the invention consists in the novel construction of the parachute, and particularly in providing positive protection for the rigging-ropes, while the device is in a closed, rolled, folded or packed condition, so as to prevent twisting or tangling of said rigging-ropes, and consequently insure a prompt opening of the device.

The invention further consists of certain details of construction and arrangement of parts, all of which will be first fully described and afterward specifically pointed out in the appended claims.

Referring to the accompanying drawings:

Figure 1 is an elevation of a parachute constructed in accordance with this invention in full open position, the same being diagrammatically shown in closed position in dotted lines, and the rigging-ropes being illustrated in full extended position in broken lines.

Fig. 2 is an elevation of the parachute in closed position in full lines, the rigging-ropes being illustrated also in full extended position and the parachute in initial position of opening in dotted lines.

Fig. 3, is an enlarged fragmentary view or fragment of the parachute body, illustrating one of the rigging-rope-receiving pockets thereon, with its rigging-rope laid therein and Fig. 4 is a fragmentary transverse sectional view through one of said rigging-rope-receiving pockets with its rigging-rope therein, said section being taken on line 4—4 of Fig. 3.

Like numerals of reference indicate the same parts throughout the several figures, in which:

1 indicates the device including the parachute-body 2 of suitable fabric, provided with the usual central opening 3. Disposed on said body 2 and radially thereof or otherwise, are the rigging-ropes 4, said ropes being of suitable flexible material and secured permanently on the parachute-body 2 as in the position shown in Fig. 1. A binding rope 5 may be provided around the perimeter of the parachute, although the construction and arrangement of the body 2 may be altered in these particulars to meet various conditions.

The rigging-ropes 4 pass from the parachute-body 2 to a trapeze, harness, basket, ring, or other device 6, depending on the type and specific purpose for which the device is to be used.

In the embodiment shown in the accompanying drawings, there is provided adjacent each rigging-rope 4, on the body 2 of the parachute, radially or otherwise, a pocket 7, open at both ends, each of said pockets being of a size and length to accommodate a rigging-rope 4 laid therein as for instance as shown in Figs. 2 and 3 or in any other convenient manner. The pockets 7 may be stationarily applied to the body 2, either on the inner or outer surface thereof, and may be permanently attached thereto as by rows of stitching 8, or they may be partially or wholly removable or detachable, the function of the pockets being the same in any instance as will now fully appear.

The parachute and rigging being arranged as shown in Fig. 1, each of the rigging-ropes 4 is drawn up into or otherwise laid or arranged within its adjacent pocket 7, preferably in the position shown in Figs. 2 and 3. All of the rigging-ropes being thus positioned, the basket, ring or other element 6 lies directly under and adjacent the mouth of the closed parachute-body as shown in full lines in Fig. 2, or in dotted lines in Fig. 1.

The parachute being, for instance, in position shown in full lines in Fig. 2, and the weight of the aeronaut being applied to the element 6, as in jumping from a balloon or the like, said element 6 under the influence of said weight, drops into position shown in dotted lines in Fig. 2, or from position shown in dotted lines in Fig. 1 to position shown in broken lines in Fig. 1, withdrawing the rigging-ropes 4 from their pockets 7 and bring them into proper effective position, free from twists and tangles and permitting immediate initial opening of the parachute-body 2, as shown in dotted lines in Fig. 2, and a perfect opening of the parachute-body 2 as shown in full lines in Fig. 1.

Having thus fully described the invention, it is apparent from the foregoing specification taken in connection with the accompanying drawings, that the danger of twisting or tangling the rigging-ropes of a parachute constructed in accordance with this invention, is effectually eliminated, and that an immediate opening of the parachute-body is insured, even in the launching of the parachute in great haste or under extreme conditions.

It is also apparent that the device is susceptible to changes, alterations and modifications in design, arrangement and construction of the parts, and I consider myself clearly entitled to all such changes and modifications as fall within the limit and scope of the appended claims.

What I claim as new and desire to secure by Letters Patent of the United States, is:

1. A parachute including a parachute-body of suitable fabric, rigging ropes of suitable flexible material, and means permanently attached to the parachute-body to receive that portion of the said rigging-ropes extending from the parachute body to protect the ropes against twisting and tangling.

2. A parachute including a parachute-body of suitable fabric, rigging-ropes of suitable flexible material attached thereto, and means permanently secured to the parachute for individually receiving that portion of the said rigging-ropes extending from the parachute body to protect the ropes against twisting and tangling.

3. A parachute including a parachute-body, rigging-ropes therefor, and means permanently secured to the parachute body for receiving that portion of each of said rigging-ropes extending from the parachute body to protect one from the other and prevent twisting and tangling thereof.

4. A parachute including a parachute-body, rigging-ropes therefor, and means permanently attached to the parachute body for positively housing that portion of said rigging ropes extending from the parachute body to prevent twisting or tangling thereof.

5. A parachute including a parachute-body, rigging - ropes therefor, and means permanently attached to the parachute body for positively housing that portion of each rigging-rope separately and independently of the other rigging-ropes which extend from the parachute body.

6. A parachute including a parachute-body, rigging-ropes therefor passing from the perimeter thereof, and suitable pockets attached to the parachute body to house and protect the rigging-ropes which pass from the perimeter of the body.

7. A parachute including a parachute-body, rigging-ropes therefor passing from the perimeter thereof, and suitable pockets applied directly to the parachute body and normally permanent with respect thereto when the parachute body is in extended operative position for housing and protecting the rigging-ropes which pass from the perimeter of the body.

8. A parachute including a parachute-body, rigging-ropes therefor, and a pocket formed directly on the parachute body and normally permanent with respect thereto when the parachute body is in extended operative position to receive and house that portion of each rigging rope extending from the parachute body.

9. A parachute including a parachute body, rigging-ropes therefor, and a pocket stationarily secured on said parachute body to receive that portion of each rigging-rope which extends from the parachute body separately and independently of the others.

10. A parachute including a parachute-body, rigging-ropes therefor, and a plurality of radial pockets on said parachute-body, stationary with respect to said body when the parachute is in extended operative position, each to receive therein a rigging-rope leading from the parachute body.

11. A parachute including a parachute-body, rigging-ropes therefor leading from the perimeter thereof, and a plurality of open pockets on the parachute body and adjacent the perimeter thereof to receive the rigging ropes which lead from the perimeter of the body.

In testimony whereof I affix my signature.

CHARLES HUGH DUFFY.